May 2, 1939.  B. J. DENNISON  2,156,680
PROCESS OF MAKING LAMINATED SAFETY GLASS
Filed Dec. 4, 1936
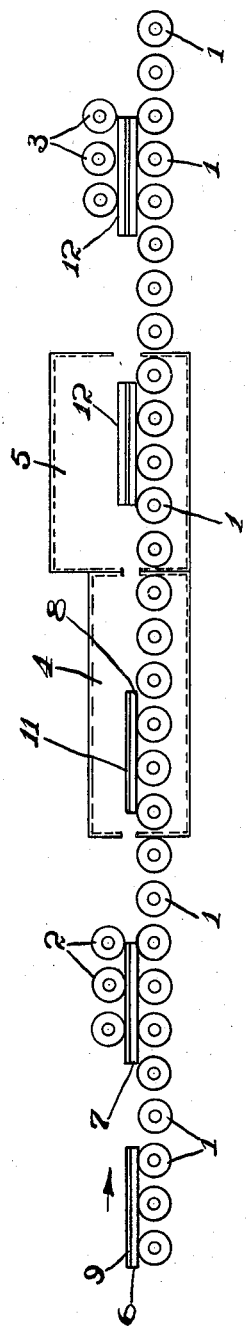
INVENTOR.
BROOK J. DENNISON
BY Bradley & Bee
ATTORNEYS.

Patented May 2, 1939

2,156,680

UNITED STATES PATENT OFFICE 2,156,680

PROCESS OF MAKING LAMINATED SAFETY GLASS

Brook J. Dennison, Aspinwall, Pa., assignor to Pittsburgh Plate Glass Company, Allegheny County, Pa., a corporation of Pennsylvania Application December 4, 1936, Serial No. 114,223

2 Claims. (Cl. 49—81)

The invention relates to a process of laminating safety glass comprising a pair of glass sheets attached to the opposite sides of a reinforced sheet, preferably a vinyl acetal resin, such as that dsclosed in the patent to E. L. Fix, No. 2,045,130, dated June 23, 1936, produced by reacting from 2.5 to 8 moles of poly-vinyl alcohol with 1 mole of a straight chain aliphatic aldehyde, or one made by reacting vinyl acetate with an aldehyde so that the major portion of the vinyl acetate is converted into vinyl acetal. Resins of this kind have a normal moisture content of from 1 to 2 per cent and when incorporated into a lamination under heat and pressure show a tendency to bubble due to the large moisture content. In order to meet this difficulty, it has been found desirable to condition the resin sheet so as to reduce the moisture content to a point well below one per cent, preferably from .25 to .4 per cent. This conditioning has been accomplished by suspending the sheets in a drying room for a period ranging from two to four hours. This method of conditioning requires a large amount of space, and since the sheets must be washed before laminating, there is a reabsorption of moisture, so that some difficulty is experienced in getting the low moisture content which is desired. Further, the sheets of resin when hung in a drying room tend to shrink and pull out of shape. It is the object of the present invention to provide a conditioning procedure in which the time period is reduced from several hours to a few minutes; which permits the washing of the resin sheets before the drying step so that the desired degree of dryness is more easily attained; which permits the heat employed in drying the resin to be utilized in part in the subsequent laminating operation, in which shrinkage and distortion are avoided in the drying operation; and which involves a saving in labor.

Briefly stated, the foregoing result is accomplished by drying the resin sheets on the glass sheets which are to constitute a part of the laminations, preferably by passing the series of glass sheets, each carrying a resin sheet, through a drying oven which is heated to a temperature of upwards of 200 deg. F. In this way, the moisture content may be reduced to a fraction of one per cent in a few minutes. Under these conditions, the resin sheets adhere to the glass sheets and are prevented from shrinking and becoming distorted during the drying operation. The hot sheets of glass and resin may now be supplied with a second sheet of glass to complete the assembly, so that the heat accumulated in the drying operation is utilized in the preliminary pressing operation. After the assembly is made, it is subject to a final pressing operation in an autoclave in accordance with the common practice of the art. The method is illustrated in the accompanying drawing, wherein:

The figure is a diagrammatic side elevation of one form of apparatus which may be employed.

Referring to the drawing, 1, 1, 1, etc., are a series of driven rolls constituting a runway; 2, 2 and 3, 3 are presser rolls; 4 is a drying or conditioning chamber or oven; and 5 is an assembling room. In operation, glass plates, such as 6, 7, 8, etc. are carried along the runway from left to right, as indicated by the arrow. These plates are washed and dried as are also the resin sheets 9, 10, 11, etc. by suitable means, which are not shown. After the resin sheets are placed on the glass sheets, they are carried beneath the rolls 2, 2 which expel any air from between the sheets and cause the resin sheets to adhere lightly to the glass sheets due to atmospheric pressure, this operation occurring at ordinary room temperature, preferably at from 60 to 70 degrees F. The glass sheets carrying the resin sheets then pass through the conditioning or drying chamber 4 which has a temperature of 260 to 300 degrees F. where the resin sheets are dried to a point where their moisture content is less than .4 of one per cent, preferably about .25 of one per cent. This requires a period of from 2 to 5 minutes depending on the temperature of the oven. As the pairs of sheets emerge from the chamber 4 into the chamber 5, the second glass sheet 12 is added, thus completing the assembly. The chamber 5 is preferably at ordinary room temperature, and the glass sheets, which are here added to complete the assemblies, may be at a corresponding temperature or may be at a much higher temperature secured by passing such sheets through the chamber 4 alongside the assemblies of glass and resin sheets or in series therewith. After the assemblies emerge from the chamber 5, they are passed beneath nipper or presser rolls 3, 3 which serve to expel the air from between the resin sheets and the glass sheets 12 and seal the assemblies at the edges. The assemblies are now ready for final pressing in the usual way in an autoclave or by any other suitable method. If an autoclave is used, the pressure ordinarily employed is about 150 pounds per square inch and the temperature of the liquid in the autoclave is from 260 to 275 degrees F.

It will be noted that the time cycle required for conditioning the resin sheets is relatively short, the operation is of a straight away character reducing the labor required to a minimum, and that the application of heat in drying the resin is utilized in connection with the preliminary pressing and sealing operation as accomplished by the presser rolls 3, 3. It will be understood that the showing of the apparatus is merely diagrammatic and that the length of the runway, the length of the chambers 4 and 5, and the number of rolls 2, 2 and 3, 3 are in no way governed by the illustration. In practice, suitable expedients are employed to prevent pinching of the forward edges of the resin sheets so as to thin them as they start beneath the rolls 2, 2 and 3, 3, such as the use of stop means limiting the approach of the first of the rolls or by the use of a blank or chuck of proper thickness which precedes the assembly. The adhesion of the resin sheets to the glass sheets prevents shrinkage and distortion of the resin sheets during their passage through the conditioning chamber 4. Certain of the vinyl acetal resins will adhere to the glass sheets under heat and pressure as above described without the use of cement, but other of such resins require cement. In those cases in which cement is required, such cement is applied to the faces of the glass sheets next to the resin sheet and allowed to dry before making the assembly. The procedure is in other respects as above described, the cement becoming active under the heat and pressure applied in the autoclave in which substantially the same temperature and pressure are used as in those cases in which no cement is employed.

What I claim is:

1. A process of making a laminated plate, which consists in placing a preformed vinyl acetal resin sheet upon one of the glass sheets which is to form a part of the laminated plate, moving the assembly forward horizontally and in such movement applying rolling pressure to the resin sheet to expel the air between such sheet and the glass sheet and cause the resin to adhere lightly to the glass sheet, continuing the forward movement of the assembly through a heated area to reduce the moisture content of the resin sheet to a fraction of one per cent, applying a second glass sheet on the resin sheet, and finally subjecting the assembly to a progressive rolling pressure while heat is applied thereto.

2. A process of making a laminated plate which consists in placing a preformed plastic sheet upon one of the glass sheets which is to form a part of the laminated plate, moving the assembly forward horizontally and in such movement applying rolling pressure to the plastic sheet to expel the air between such sheet and the glass sheet and cause the plastic sheet to adhere lightly to the glass sheet, continuing the forward movement of the assembly through a heated area to reduce the moisture content of the plastic sheet to a fraction of one per cent, applying a second glass sheet to the plastic sheet, and finally subjecting the assembly to a progressive rolling pressure while heat is applied thereto.

BROOK J. DENNISON.